United States Patent
Kronfeld et al.

(10) Patent No.: US 7,307,577 B1
(45) Date of Patent: Dec. 11, 2007

(54) STORM TOP DETECTION

(75) Inventors: Kevin M. Kronfeld, Cedar Rapids, IA (US); Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/528,803

(22) Filed: Sep. 28, 2006

(51) Int. Cl.
*G01S 13/95* (2006.01)
*G01S 13/00* (2006.01)

(52) U.S. Cl. .................. 342/26 B; 342/26 R; 342/89; 342/91; 342/118; 342/123; 342/175; 342/176; 342/179; 342/195

(58) Field of Classification Search .... 342/26 R–26 D, 342/118, 123, 175, 176, 179, 190–197, 89, 342/91, 134–144
See application file for complete search history.

(56) References Cited

U.S. PATENT DOCUMENTS

| | | | | |
|---|---|---|---|---|
| 3,197,768 A | * | 7/1965 | Lhermitte | 342/26 D |
| 3,720,949 A | * | 3/1973 | Richter | 342/26 D |
| 3,725,914 A | * | 4/1973 | Davidson et al. | 342/26 D |
| 3,896,382 A | * | 7/1975 | Magenheim | 342/26 D |
| 4,011,565 A | * | 3/1977 | Toman | 342/26 D |
| 4,346,595 A | * | 8/1982 | Frosch et al. | 342/26 B |
| 4,722,599 A | * | 2/1988 | Fruengel et al. | 342/26 D |
| 4,761,650 A | * | 8/1988 | Masuda et al. | 342/26 D |
| 5,198,819 A | | 3/1993 | Susnjara | |
| 5,311,183 A | * | 5/1994 | Mathews et al. | 342/26 B |
| 5,945,926 A | | 8/1999 | Ammar et al. | |
| 6,201,494 B1 | * | 3/2001 | Kronfeld | 342/26 R |
| 6,252,539 B1 | * | 6/2001 | Phillips et al. | 342/26 D |
| 6,549,161 B1 | | 4/2003 | Woodell | |
| 6,675,099 B2 | * | 1/2004 | Katsuhiro | 342/26 R |
| 6,741,203 B1 | * | 5/2004 | Woodell | 342/26 B |
| 6,879,280 B1 | | 4/2005 | Bull et al. | |
| 2004/0239550 A1 | | 12/2004 | Daly, Jr. | |

OTHER PUBLICATIONS

Web page http://www.avweek.com/shownews/02asia1/avion06b.htm, page printed May 17, 2006.
"Collins WXR-2100 Multiscan™ Weather Radar" brochure, Jan 1, 2000.
"Multiscan™ Overview" brochure, page printed May 17, 2006.
Web page http://www.rockwellcollins.com/ecat/at/WXR-2100_PrintFriendly.html, page printed May 17, 2006.

* cited by examiner

*Primary Examiner*—Bernarr E. Gregory
(74) *Attorney, Agent, or Firm*—Nathan O. Jensen; Kyle Eppele

(57) ABSTRACT

A method of characterizing a maximum height of a storm cell for an aircraft is provided. First reflectivity data formed from a first scan of a storm cell by a radar is received and a first centroid of the storm cell is identified. Second reflectivity data formed from a second scan of the storm cell by the radar is received and a second centroid of the storm cell is identified. A scan axis for a third scan of the storm cell based on the first centroid and the second centroid is determined. Third reflectivity data formed from the third scan of the storm cell by the radar at a first time is received. The third reflectivity data is sampled to form pixel data that includes a reflectivity indicator determined for each pixel formed from the third reflectivity data. A maximum height of the storm cell is determined by processing the pixel data.

32 Claims, 11 Drawing Sheets

STORM TOP DETECTION

BACKGROUND OF THE INVENTION

The present application relates generally to weather detection. More particularly, the present application relates to the detection of storm tops.

Thunderstorms are a violent example of atmospheric convection with the uplift and cooling of air and subsequent cloud formation. As the cloud forms, water vapour changes to liquid and/or to frozen cloud particles resulting in a large release of heat that becomes the principal source of energy for the developing cloud. The cloud particles grow by colliding and combining with each other, forming rain, snow, and/or hail. High level winds may shear the cloud top into an anvil shape. When the droplets become heavy enough to fall against the updraft created as the cloud forms, precipitation begins. Once precipitation begins the updraft which initiated the cloud's growth weakens and is joined by a downdraft generated by the precipitation. This updraft-downdraft couplet constitutes a single storm cell. A typical storm is composed of multiple cells that form, survive for about half an hour, and then weaken and disperse. In some circumstances, new cells may replace old ones making it possible for some storms to continue for up to several hours.

Storm tops are hazards to aircraft. Conventionally, pilots use weather radar to detect and then avoid hazardous weather. Effectively and efficiently identifying and predicting storm tops using a weather radar is very beneficial for pilots that need to fly over the storm cell to avoid the hazardous weather. Meteorological radars are capable of detecting precipitation and variations of the refractive index in the atmosphere that may be generated by local variations of temperature or of humidity. The returned signal from the transmitted pulse encountering a weather target has an amplitude, a phase, and a polarization. The amplitude is used to determine the reflectivity and to estimate the mass of precipitation per unit volume or the intensity of precipitation through the use of empirical relations.

In general, modern weather radars automatically perform a volume scan consisting of a series of full azimuth rotations of the antenna at several elevation angles. The raw polar data may be stored in a three-dimensional array for further data processing and archiving. Using application software, a wide variety of meteorological products may be generated and displayed as images on a display. Grid or pixel values and conversion to x-y coordinates are computed using three-dimensional interpolation techniques. Each image pixel represents a color-coded value of a selected variable such as the reflectivity, the rainfall rate, etc. Vertically-integrated liquid can be displayed for any specified layer of the atmosphere as an indicator of the intensity of severe storms.

Turbulence is the leading cause of in-flight injuries to passengers and cabin crews on aircraft. A high turbulence region exists above a storm cell, but is difficult to detect with radar due to the low reflectivity. However, if a weather radar system can detect and predict the location of the high turbulence region with sufficient response time, aircraft can successfully avoid storm system hazards. Thus, there is a need for a system and a method for efficiently detecting the height of a storm cell. What is further needed is a system and a method to predict the change in the height of the storm cell for a forecast time period so that the aircraft can better respond to the changing conditions.

SUMMARY

An exemplary embodiment provides a method and a system for efficiently detecting a maximum height of a storm cell. The method and system may further provide prediction of the change in height of the storm cell so that the aircraft can avoid the storm cell, if necessary. The system includes, but is not limited to, an antenna adapted to receive signals reflected from a storm cell; a receiver coupled to the antenna and adapted to process the received signals thereby forming reflectivity data associated with a scan of the storm cell; a processor coupled to the receiver; and a memory operably coupled to the processor. The processor is configured to receive first reflectivity data from the receiver formed from a first scan of the storm cell; identify a first centroid of the storm cell based on the received first reflectivity data; receive second reflectivity data from the receiver formed from a second scan of the storm cell; identify a second centroid of the storm cell based on the received second reflectivity data; determine a scan axis for a third scan of the storm cell based on the first centroid and the second centroid; send the determined scan axis to a radar controller adapted to control execution of the third scan; receive third reflectivity data from the receiver formed from the third scan of the storm cell at a first time; sample the received third reflectivity data to form pixel data; and process the formed pixel data to determine a first maximum height of the storm cell. The pixel data comprises a plurality of pixels, wherein each pixel of the plurality of pixels identifies a segment of the third reflectivity data. A reflectivity indicator is determined for each pixel. The memory receives and stores the pixel data.

An exemplary method of characterizing a maximum height of a storm cell for aircraft avoidance of the storm cell is provided. The method includes receiving first reflectivity data formed from a first scan of a storm cell by a radar; identifying a first centroid of the storm cell based on the received first reflectivity data; receiving second reflectivity data formed from a second scan of the storm cell by the radar; identifying a second centroid of the storm cell based on the received second reflectivity data; determining a scan axis for a third scan of the storm cell based on the first centroid and the second centroid; receiving third reflectivity data formed from the third scan of the storm cell by the radar at a first time; sampling the received third reflectivity data to form pixel data, wherein the pixel data comprises a plurality of pixels; and processing the formed pixel data to determine a first maximum height of the storm cell. Each pixel of the plurality of pixels identifies a segment of the third reflectivity data. A reflectivity indicator is determined for each pixel.

Another exemplary embodiment of the invention includes computer-readable instructions that, upon execution by a processor, cause the processor to implement the operations of the method.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION

Figure 1:
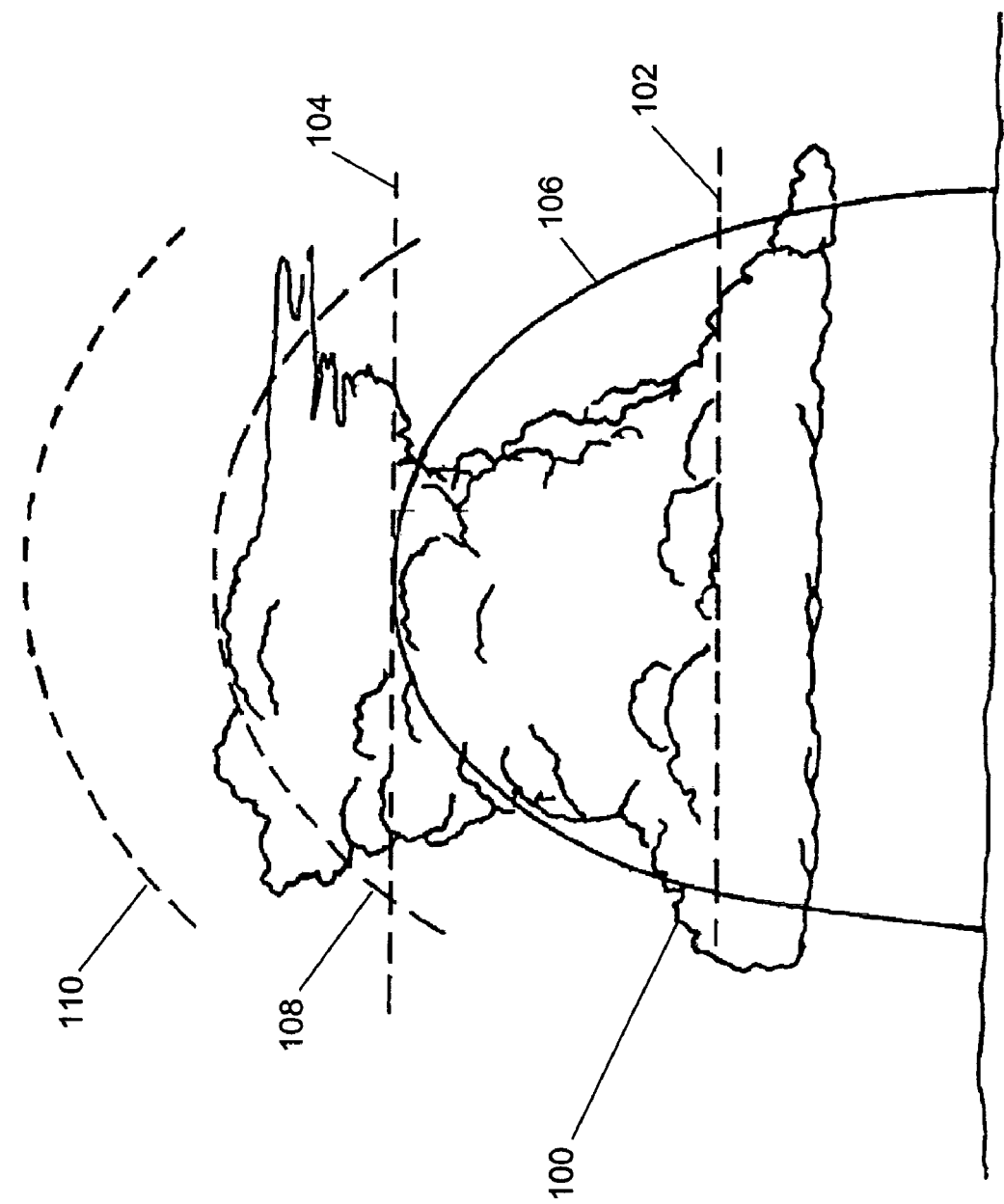
FIG. 1 is a diagram illustrating the spatial characteristics of an exemplary thunderstorm.

With reference to FIG. 1, a diagram illustrating the spatial distribution of a typical thunderstorm 100 is shown. The portion of thunderstorm 100 below a first altitude 102 contains water in liquid form. The portion of thunderstorm 100 below a second altitude 104 and above first altitude 102 contains a mixture of ice and water in liquid form. The portion of thunderstorm 100 above second altitude 104 contains only ice. Most of the reflectivity of a storm originates from the moisture that it contains and often the top of the storm is significantly higher than the moisture based radar reflectivity indicates. As a result, based on the geometry of thunderstorm 100, regions may be defined by their ability to be detected by radar, their visibility to a pilot, and their effect on an aircraft. Region 106, which includes the liquid water and the mixed ice and water portions of thunderstorm 100, is a region that is detectable by an aircraft radar system, due to the high and moderate radar reflectivity of those portions of thunderstorm 100. A storm top 108 (above region 106), which includes the ice portion of thunderstorm 100, is a region that is visible to a pilot, but is not detectable by radar at long range, due to the low radar reflectivity of the ice portion of thunderstorm 100. Region 110 (above region 108) is not visible or detectable by radar, but is a region of possible high turbulence which can affect the stability of an aircraft flying through region 110.

Thunderstorms may further be divided into isotherm layers based on temperature. For example, a generally horizontal scan of a thunderstorm may include an isotherm layer between approximately negative twenty degrees Celsius and negative forty degrees Celsius. Another generally horizontal scan of a thunderstorm may include an isotherm layer below zero degrees Celsius.

Figure 2:
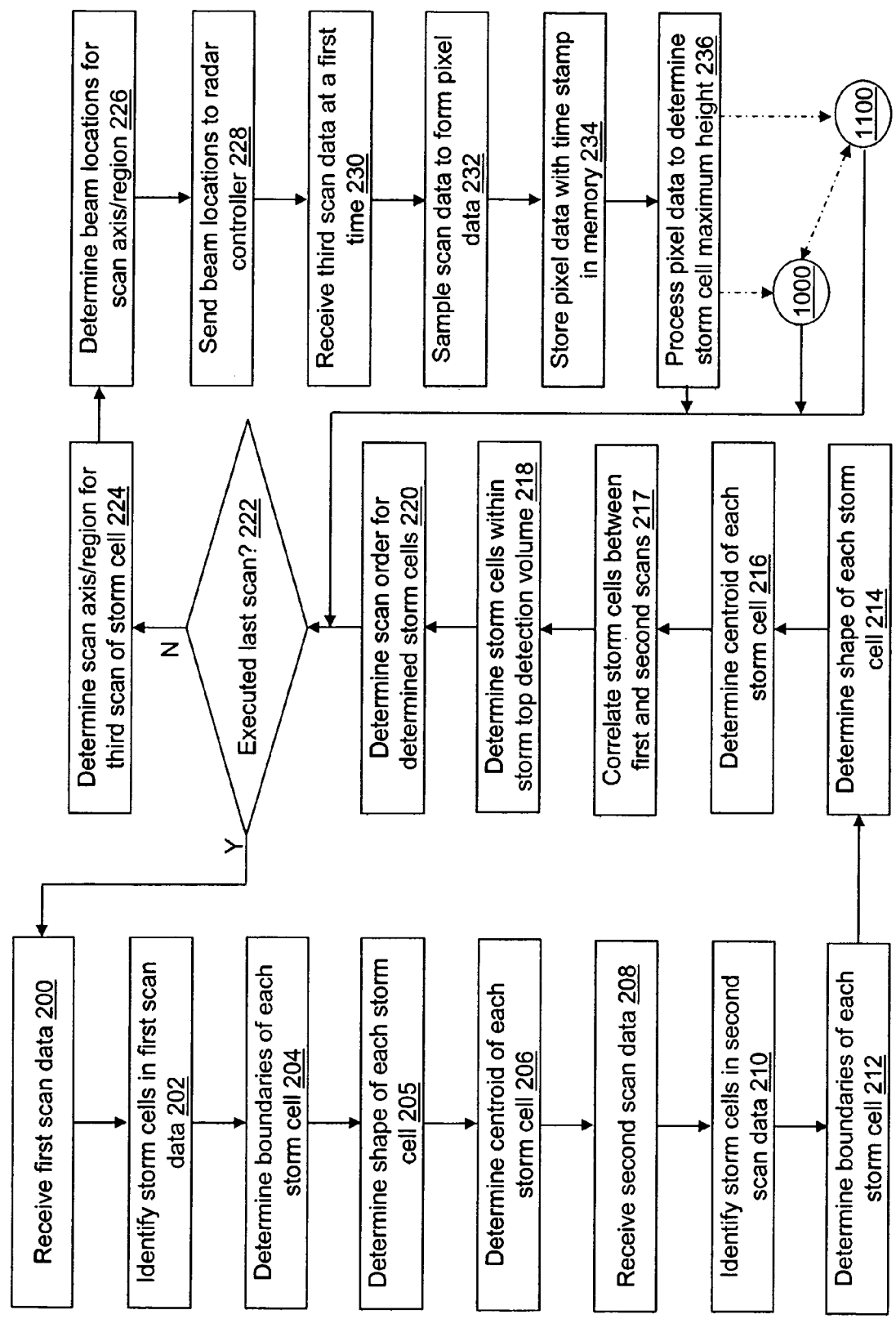
FIG. 2 is a flow diagram illustrating exemplary operations performed by a storm top detection application in accordance with an exemplary embodiment.

With reference to FIG. 2, exemplary operations in performing storm top detection are described. Additional, fewer, or different operations may be performed, depending on the embodiment without deviating from the spirit of the invention. In an operation 200, first scan data is received from a radar receiver. The scan data is formed from radar return signals received at a radar antenna as a result of a first horizontal scan of the atmosphere surrounding the radar. In an exemplary embodiment, a radar including the radar receiver and the radar antenna is mounted on an aircraft and the horizontal scan is in the direction of the aircraft's flight path. The scan data includes reflectivity data associated with the atmosphere that includes weather related phenomena such as precipitation. A radar scan generally includes a plurality of beam locations selected to "cover" a volume of space typically described by two angles and a distance along the beam of energy transmitted from the radar antenna. Exemplary angles are azimuth, elevation, and scan angles. In an exemplary embodiment, the first scan data is coincident with a first isotherm layer of the atmosphere. For example, the first scan may include the isotherm layer between approximately zero degrees Celsius and negative ten degrees Celsius.

Successive radar scan data is stored in memory as a function of time. In an operation 202, storm cells are identified in the first scan data. For example, a storm cell may be identified for one or more regions having a reflectivity value that exceeds a threshold reflectivity level. An exemplary threshold is 30 dBZ. No storm cells may be identified in the first scan data. Alternatively, a plurality of storm cells may be identified in the first scan data. In an operation 204, boundaries of the identified storm cells are determined based on the threshold reflectivity level encompassing a contiguous area. In an operation 205, a shape of each of the identified storm cells is determined. For example, image processing algorithms are applied to the scan data or image to determine the bounded reflectivity regions represented by polygons. In an operation 206, a first centroid of each of the identified storm cells is determined. For example, the first centroid may be determined based on the most reflective region that indicates a core of the storm cell. In another exemplary embodiment, the first centroid may be determined based on the shape of the storm cell.

Figure 4:
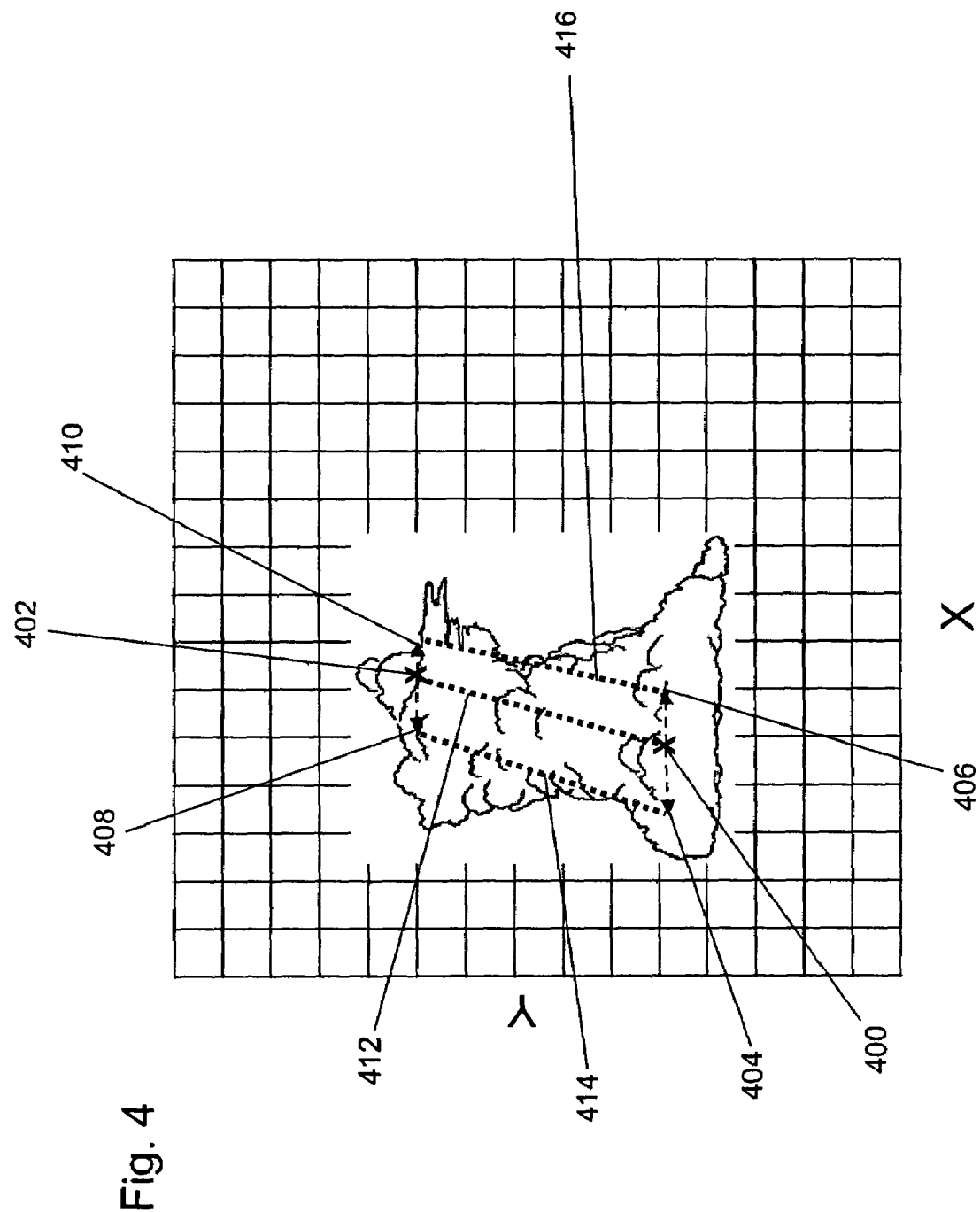
FIG. 4 is a diagram illustrating determination of a vertical scan axis and a vertical scan region in accordance with an exemplary embodiment.

With reference to FIG. 4, a first centroid 400 is shown as determined using the reflectivity data from the first scan data. In an exemplary embodiment, a first scan region may be defined relative to the first centroid. A first minimum azimuth angle 404 identifies the minimum azimuth angle of the reflectivity data that exceeds a reflectivity threshold in a decreasing azimuth direction relative to the first centroid. A first maximum azimuth angle 406 identifies the minimum azimuth angle of the reflectivity data that exceeds a reflectivity threshold in an increasing azimuth direction relative to the first centroid. The first scan region includes a plurality of beam locations that illuminate the area between the first minimum azimuth angle 404 and the first maximum azimuth angle 406. In an alternative embodiment, the first scan region is defined in the range direction. Additionally, the first scan region may be defined based on lightning data associated with the storm cell instead of reflectivity levels. The plurality of beam locations may be determined based on the pulse width, bandwidth, beamwidth, range to the centroid, width of the first scan region, etc.

In an operation 208, second scan data is received from the radar receiver. The scan data is formed from radar return signals received at the radar antenna as a result of a second horizontal scan of the atmosphere surrounding the radar. In an exemplary embodiment, the second scan data is coincident with a second isotherm layer of the atmosphere. For example, the second scan may include the isotherm layer between approximately negative twenty degrees Celsius and negative forty degrees Celsius.

In an operation 210, storm cells are identified in the second scan data. In an operation 212, boundaries of the identified storm cells are determined based on the threshold reflectivity level encompassing a contiguous area. In an operation 214, a shape of each of the identified storm cells is determined. In an operation 216, a second centroid of each of the identified storm cells is determined. In an operation 217, the storm cells identified in the first scan data and identified in the second scan data are correlated to identify a first centroid and a second centroid for the storm cell.

With reference to FIG. 4, a second centroid 402 is shown as determined using the reflectivity data from the second scan data. In an exemplary embodiment, a second scan region may be defined relative to the second centroid. A second minimum azimuth angle 408 identifies the minimum azimuth angle of the reflectivity data that exceeds a reflectivity threshold in a decreasing azimuth direction relative to the second centroid. A second maximum azimuth angle 410 identifies the minimum azimuth angle of the reflectivity data that exceeds a reflectivity threshold in an increasing azimuth direction relative to the second centroid. The second scan region includes a plurality of beam locations that illuminate the area between the second minimum azimuth angle 408 and the second maximum azimuth angle 410. In an alternative embodiment, the second scan region is defined in the range direction. Additionally, the second scan region may be defined based on lightning data associated with the storm cell instead of reflectivity levels. The plurality of beam locations may be determined based on the pulse width, bandwidth, beamwidth, range to the centroid, width of the second scan region, etc.

As stated previously, storm top 108 generally is not detectable at long range due to the lower reflectivity of ice. Additionally, at longer ranges the increasing width of the radar beam results in a reduced accuracy in a storm top determination. As a result, storm top 108 of the identified storm cells may not be determinable from the long range, horizontal first and second scan data. To address this issue, a third scan is performed to detect storm top 108 of storm cells that are located within a storm top detection volume. In an operation 218, storm cells within the storm top detection volume are determined from the identified storm cells. For example, the storm top detection volume may be defined by a range, a scan angle, an azimuth angle, and/or an elevation angle limit such as a minimum or a maximum. In an exemplary embodiment, the storm top detection volume is defined by a maximum range that is less than a maximum range of the first and/or second scans. For example, a maximum range of the third scan may be approximately half of the maximum range of the first and/or second scans. In an exemplary embodiment, the maximum range of the storm top detection volume is approximately 80 nautical miles (nm); whereas a maximum range of the first and/or second scans is approximately 320 nm.

In an operation 220, a scan order is determined for the storm cells determined to be located within the storm top detection volume. For example, storm cells that are near the aircraft and/or flight path may be scanned before other cells that are further away from the aircraft and flight plan. Additional parameters that may be used to determine the scan order of the storm cells determined in operation 218 include, but are not limited to, a last vertical scan time for the storm cells, a last vertical scan time exceeding a threshold, a level of storm maturity, i.e., a growing storm cell may be scanned more often than a decaying storm cell, a storm hazard level, an increased lightning rate, etc.

An operation 222 determines when the third scan(s) are complete for the storm cells determined to be located within the storm top detection volume. If the third scans are complete, processing continues at operation 200. If the third scans are not complete, processing continues at operation 224. In operation 224, a scan axis is determined for the third scan of the storm cell currently being processed. The scan axis is determined by connecting the first centroid and the second centroid of the correlated storm cells. For example, with reference to FIG. 4, a scan axis 412 is determined by connecting first centroid 400 and second centroid 402 of the correlated storm cells.

In operation 226, a plurality of beam locations for the third scan of the storm cell are determined based on scan axis 412 determined in operation 224. The plurality of beam locations may comprise a lowest elevation angle and a highest elevation angle along the determined scan axis. Thus, the third scan generally forms a vertical scan between the first centroid and the second centroid of the correlated storm cells. The third scan may further include a region surrounding the determined scan axis. For example, the third scan may include the plurality of beam locations determined for the first scan region and/or the second scan region. Additionally, the third scan may include a plurality of beam locations determined to illuminate the region bounded by a minimum azimuth line 414 and a maximum azimuth line 416 as shown with reference to FIG. 4. Minimum azimuth line 414 extends between first minimum azimuth angle 404 and second minimum azimuth angle 408. Maximum azimuth line 416 extends between first maximum azimuth angle 406 and second maximum azimuth angle 410.

In an operation 228, the determined beam locations for the third scan are sent to a radar controller. The third scan of the storm cell is conducted by transmitting a signal centered at each beam location and receiving returns from each beam location. The radar antenna may perform the third scan by steering to each beam location mechanically or electrically. In an operation 230, the third scan data is received from the radar receiver at a first time.

In an operation 232, the received third scan data is sampled to form pixel data that includes a reflectivity indicator for a plurality of pixels. Each pixel of the plurality of pixels identifies a segment of the received third scan data. The reflectivity indicator is determined for each pixel. The pixel data may be captured in a variety of formats. For example, the plurality of pixels may define a two dimensional region defined in a variety of coordinate systems as known to those skilled in the art both now and in the future. The plurality of pixels may be indexed using an x pixel number and a y pixel number. The reflectivity indicator may be a binary yes or no value such as a flag having a value of zero (false) or one (true), a value representative of the reflectivity level of the pixel, a value representing a color or intensity level for a graphical display, etc.

Preferably, the y pixel number is related to the height of the storm cell, and the x-pixel number is related to the range of the storm cell from the radar antenna or to the azimuth of the storm cell relative to the flight path. In general, the height of the storm cell is defined as a distance above ground or an altitude. Additionally, the pixel data may define a three dimensional region that may be indexed using an x pixel number (i.e., range), a y pixel number (i.e., height), and a z pixel number (i.e., azimuth). The pixel data may be rotated and/or translated to compensate for aircraft movement and/ or to convert the data into a different coordinate reference system. In an operation 234, the pixel data including a time stamp at which the third scan data was received is stored in a memory.

In an operation 236, a maximum height of the storm cell is determined by processing the pixel data. Various methods exist for processing the pixel data to determine the maximum height or storm top of the storm cell. For example, a heuristic search technique may be used based on traversal of the pixel data. However, additional/different search mechanisms may be implemented (binary, tree, graph, blind, etc.) in processing the pixel data. The height of the storm cell is determined by searching the pixel data associated with the storm cell for the highest pixel that indicates a reflection which is defined based on a minimum reflectivity threshold. For example, if the pixel data includes a single storm cell, the pixel data can be traversed in row-major fashion starting at an upper corner until a pixel containing a reflective value exceeding the minimum reflectivity threshold is identified. If the y-pixel data is related to the height, the resulting pixel represents the highest point in the pixel data that contains reflectivity information "detectable" by the radar based on the minimum reflectivity threshold. Processing continues at operation 222 until the third scan has been executed for the storm cells determined to be located within the storm top detection volume. In another exemplary embodiment, processing may continue at an operation 1000 shown with reference to FIG. 10. In yet another exemplary embodiment, processing may continue at an operation 1100 shown with reference to FIG. 11.

Figure 3:
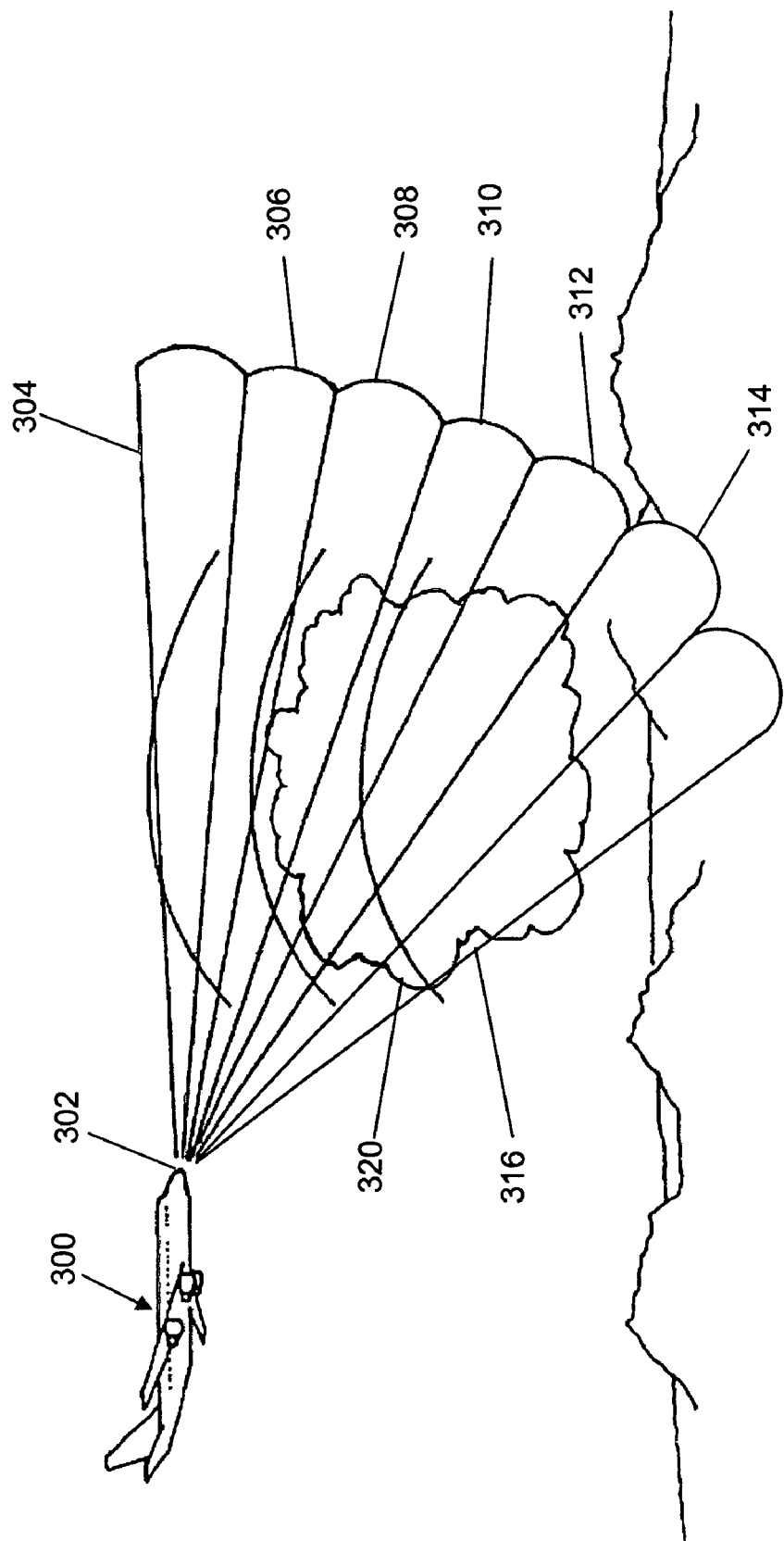
FIG. 3 is a diagram illustrating a vertical scan in accordance with an exemplary embodiment.

Referring to FIG. 3, an aircraft 300 is depicted having a radar 302 mounted near the nose of aircraft 300. Radar 302 is capable of transmitting a plurality of radar beams 304, 306, 308, 310, 321, 314, 316 and receiving reflective energy from a thunderstorm 320. The plurality of radar beams 304, 306, 308, 310, 321, 314, 316 form a vertical radar scan. The plurality of radar beams 304, 306, 308, 310, 321, 314, 316 may be scanned in any order. If mechanical steering of the radar antenna is used, the plurality of radar beams 304, 306, 308, 310, 321, 314, 316 are preferably scanned in the order 304, 306, 308, 310, 321, 314, 316 or in the order 316, 314, 312, 310, 308, 306, 304. The location of the plurality of radar beams 304, 306, 308, 310, 321, 314, 316 can be adjusted for local winds in the area of the storm cell, which can create an anvil shape thereby creating a measurable radar top on a separate vertical axis as compared to the predominate core axis of the storm cell. In addition, an offset vertical scan can be executed on the downwind side of the storm cell to determine the existence of an anvil, which is an indicator of the maturity of the storm cell. Similarly, an upwind vertical scan can be performed to determine the existence of a supercell.

By performing a generally vertical scan in response to a determination that a storm cell is within a storm top detection volume, the time required to perform the third scan is reduced in comparison to a full or more complete three-dimensional radar scan. Various processing of the radar return data may be performed as known to those skilled in the art both now and in the future. For example, clutter rejection or suppression techniques may be utilized to reduce or remove the generally large returns that result from the ground.

The storm top height may be stored in a memory and/or displayed on an electronic flight information system display. Storm cells detected by the radar or other sources, but outside the storm top detection volume may be included on the display if received from other storm top detection sources. Other storm top detection sources may include other aircraft, ground based radars, satellites, etc. The storm top information may be transmitted to the aircraft and displayed to the pilot in conjunction with the storm cell information determined by the radar mounted on the aircraft to provide complete situational awareness. Other storm top sources can also be used to display storm cells within the storm top detection volume if the storm cells are obscured by other storm cells or other obscurations.

Figure 5:
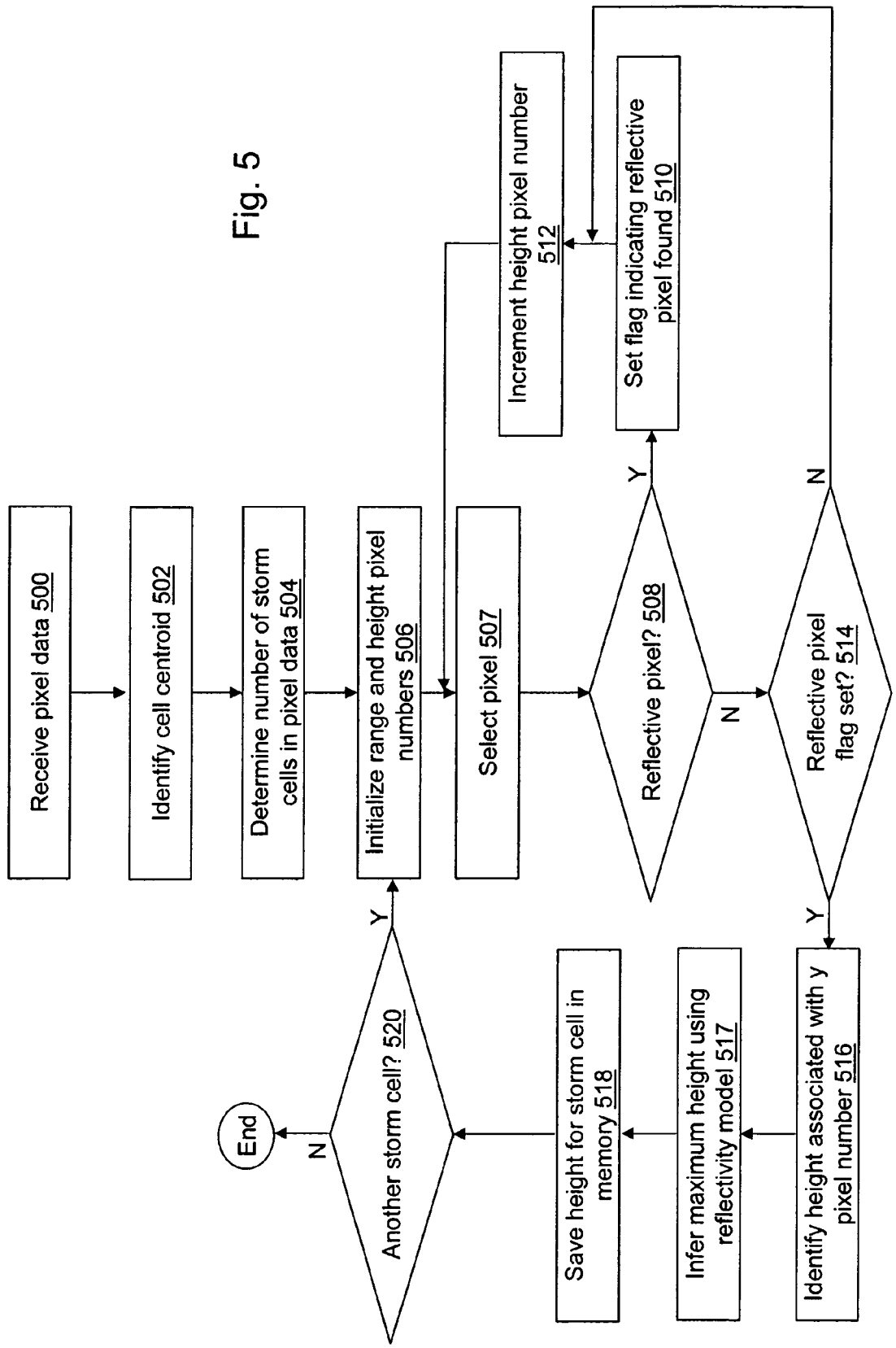
FIG. 5 is a flow diagram illustrating exemplary operations performed by a storm top detection application to determine a maximum height of the storm cell in accordance with a first exemplary embodiment.

If multiple cells are present in the pixel data, a traversal of the pixel data in row major fashion starting at an upper corner is inadequate. With reference to FIG. 5, exemplary operations in determining a maximum height of the storm cell in pixel data that includes a plurality of storm cells are described in accordance with a first exemplary embodiment. Additional, fewer, or different operations may be performed, depending on the embodiment. In an operation 500, the pixel data formed from the third scan data is received from a memory. The pixel data includes a reflectivity indicator for a plurality of pixels. The plurality of pixels can be indexed using an x pixel number and a y pixel number. In an operation 502, a centroid of a first storm cell is identified. In an operation 504, a number of storm cells identified in the pixel data is determined. For example, by comparing the range and azimuth of the detectable storm cells with the range and azimuth extent of the plurality of radar beams used to generate the third scan, the number of storm cells can be determined. If the centroid of a plurality of storm cells is located in the vertical scan area, the height information for each of the plurality of storm cells can be determined from the single scan. Of course, the number of storm cells can be determined before executing the vertical scan to reduce the radar resources required to determine the height of each storm cell.

The pixel data is processed by traversing the plurality of pixels to identify a pixel associated with the maximum height of the storm cell. In an operation 506, an x-pixel number is initialized to an x centroid pixel number of the first storm cell and a y pixel number is initialized to a minimum y pixel number. In an exemplary embodiment, the x pixel number represents a range from the aircraft, and the y pixel number represents a height above ground. In another exemplary embodiment, the x pixel number may represent an azimuth angle from the aircraft flight path. In an operation 507, a pixel of the pixel data is selected by using the x pixel number and the y pixel number as an index into the plurality of pixels.

In an operation 508, a determination of whether or not the reflectivity indicator of the pixel indexed with the x pixel number and the y pixel number indicates a reflectivity value that exceeds the threshold is made. If the selected pixel is reflective, processing continues at an operation 510. In operation 510, a flag is set indicating that a reflective pixel has been found. In an operation 512, the y pixel number is incremented, and processing continues at operation 507. If the selected pixel is not reflective, processing continues at an operation 514. In operation 514, whether or not the flag is set indicating that a reflective pixel has been found is determined. If the flag is not set, processing continues at operation 512. If the flag is set, processing continues at operation 516.

In operation 516, a height associated with the y pixel number is identified. For example, a minimum (maximum) height may be defined for or calculable from the lowest (or highest) y pixel number and/or the x pixel number corresponding with the lowest (or highest) y pixel number. The height associated with the y pixel number can be calculated based on the minimum (maximum) height, the resolution of each pixel in the vertical dimension, and the offset from the minimum (maximum) y pixel number. In an operation 517, a height of the storm top (maximum height) is inferred using a reflectivity model. The reflectivity model describes the vertical reflectivity change as a function of altitude for storm cells. Using the reflectivity model, the reflectivity value associated with the pixel (or the threshold) may be used to infer an actual height of the storm top which was not actually "detectable" in the scan data. For example, the reflectivity model may assume a linear variation in reflectivity as a function of altitude and indicate a 300 meter altitude difference between 30 dBZ and 0 dBZ, which indicates the actual storm top. Thus, if the threshold is 30 dBZ, 300 meters is added to the height associated with the y pixel number to infer the height of the actual storm top which was not "detectable." In an alternative embodiment, a reflectivity model is not used to infer the height of the storm top.

In an alternative embodiment, the height is extrapolated from radar measurements performed immediately above the altitude of the freezing isotherm altitude. Because homogeneous radar beam filling is achieved at these altitudes, the extrapolation is based on reliable measurements. Input data include physical parameters associated with the storm cell and with the radar (e.g. reflectivity, Doppler parameters, etc.). Physical parameters, which are inputs of the principal components analysis process, are normalized using a statistical analysis as known to those skilled in the art both now and in the future. Nodes with a strong contribution in the global inertia are selected. For example, the inertia contribution is calculated for each node, and the inertia value of each node is classified into intervals of inertia contribution. Nodes with an inertia contribution between a median inertia and a maximal inertia are retained. A first grid criterion, which may be a function of the number of scans, the range to the node, the beam width, etc. is applied to the selected nodes to eliminate nodes with aberrant performance. A second grid criterion, which may be a function of the number of scans, the range to the node, the beam width, the distance between nodes, etc. may further be applied to detect and define outstanding areas (indirectly outstanding contour), which are a core of convective activity. An amplitude criteria may be applied to ensure that only relevant values are used. This core discrimination enables a vertical analysis of each core, and thus, a finer analysis of the convective activity within a cell. A vertical reflectivity profile has a typical shape: at low altitude, reflectivity is constant, and above an inflexion point, the reflectivity decreases with a characteristic slope. As a result, the turbulent height of the storm cell can be extrapolated using the characteristic slope and the inflexion point altitude determined using the radar measurements performed immediately above the altitude of the freezing isotherm altitude.

In an operation 518, the inferred (identified) height is saved in the memory. In an operation 520, whether or not another storm cell is within the pixel data is determined. If another storm cell is within the pixel data, processing continues at operation 506. If another storm cell is not within the pixel data, processing of the received pixel data ends.

Figure 6:
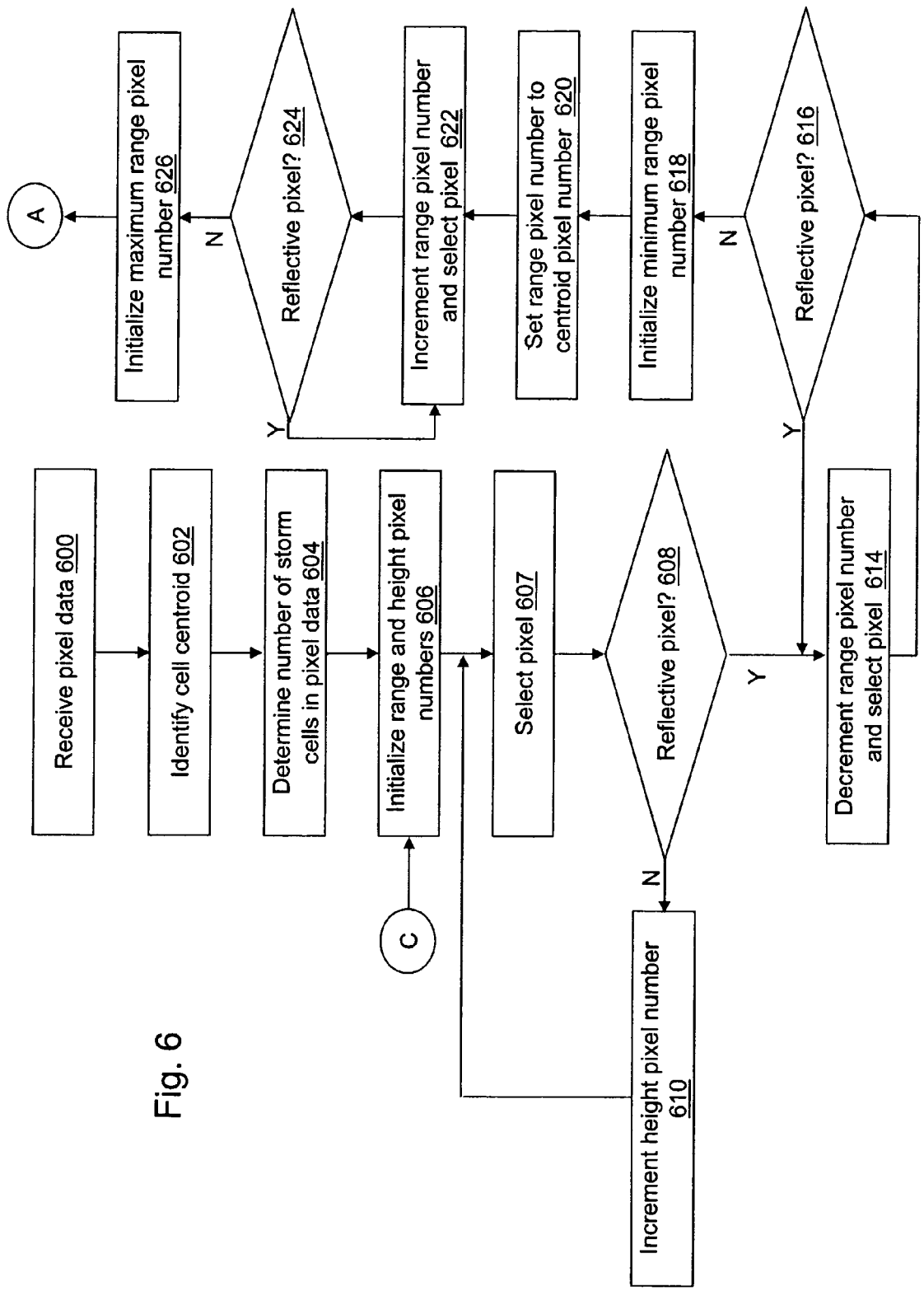
FIGS. 6-8 are flow diagrams illustrating exemplary operations performed by a storm top detection application to determine a maximum height of the storm cell in accordance with a second exemplary embodiment.
Figure 7:
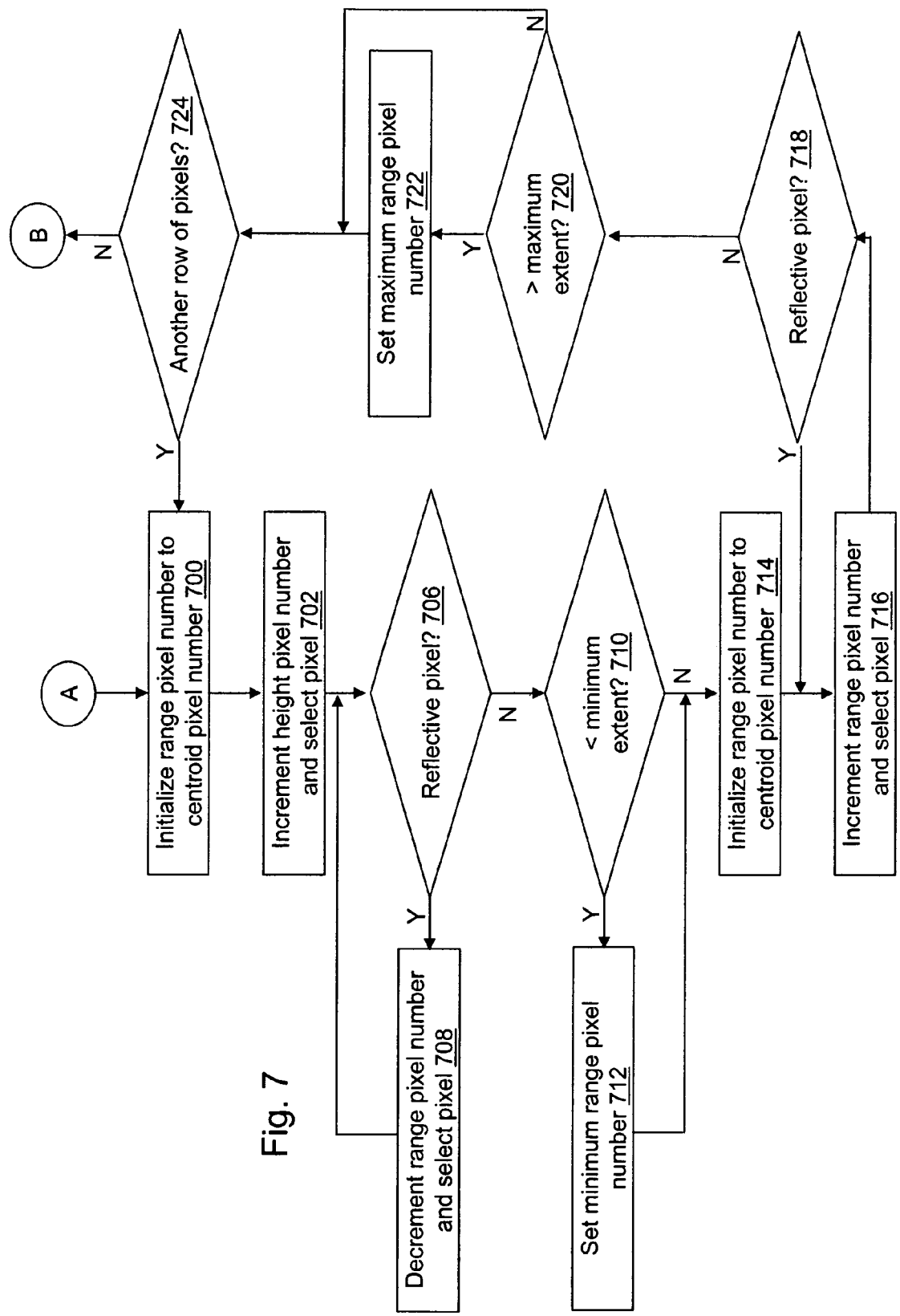
Figure 8:
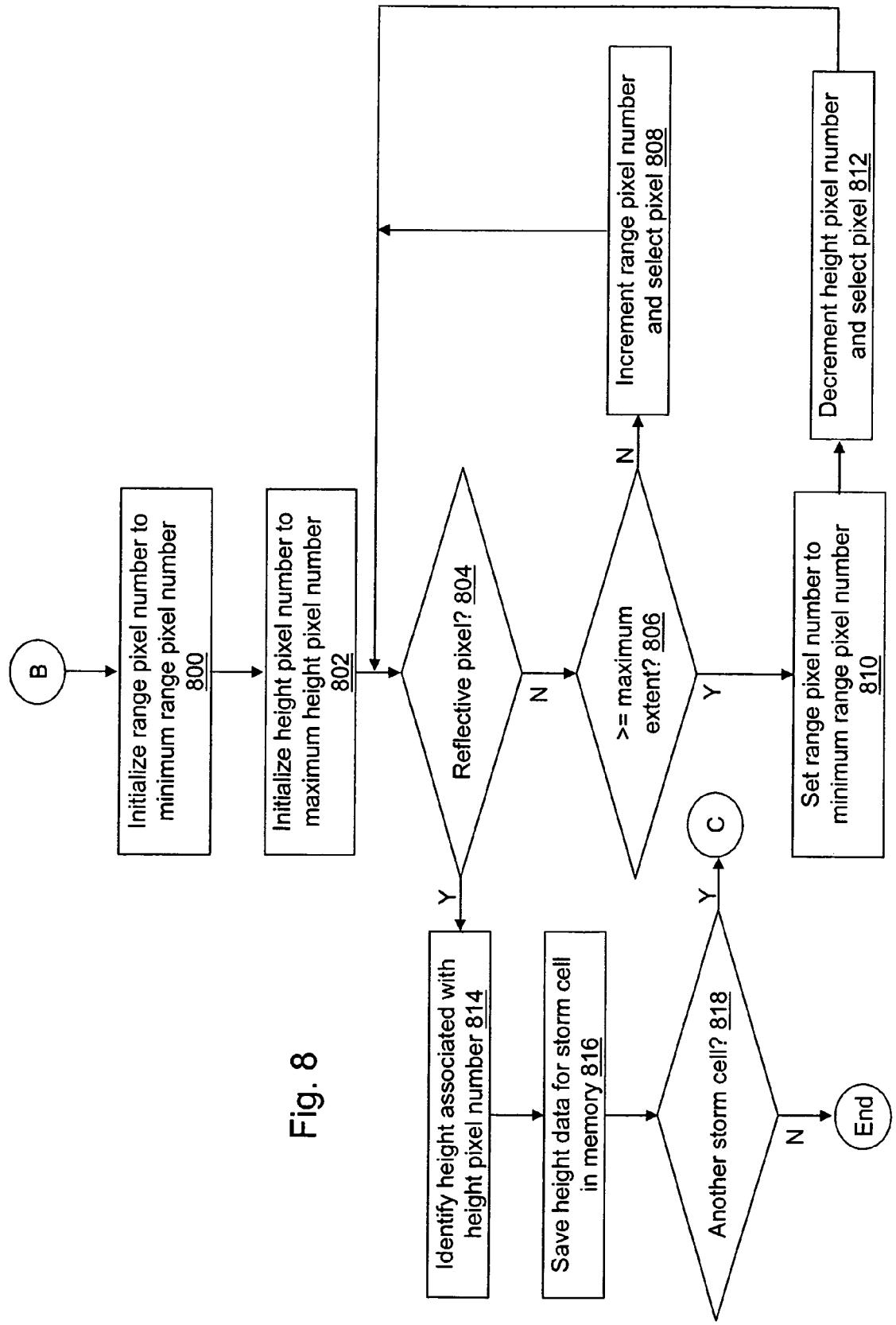

With reference to FIGS. 6-8, exemplary operations in determining a maximum height of the storm cell in pixel data that includes a plurality of storm cells are described in accordance with a second exemplary embodiment. Additional, fewer, or different operations may be performed, depending on the embodiment. In an operation 600, the pixel data from the third scan data is received from the memory. In an operation 602, a centroid of a first storm cell is identified. In an operation 604, a number of storm cells identified in the pixel data is determined. The pixel data is processed by traversing the plurality of pixels to identify a pixel associated with the maximum height of the storm cell. In an operation 606, an x-pixel number is initialized to an x centroid pixel number of the first storm cell and a y pixel number is initialized to a minimum y pixel number. In an operation 607, a pixel of the pixel data is selected by using the x pixel number and the y pixel number as an index into the plurality of pixels.

In an operation 608, a determination of whether or not the reflectivity indicator of the pixel indexed with the x pixel number and the y pixel number indicates a reflectivity value that exceeds the threshold is made. If the selected pixel is reflective, processing continues at an operation 614. If the selected pixel is not reflective, processing continues at an operation 610. In operation 610, the y pixel number is incremented and processing continues at operation 607. In operation 614, the x pixel number is decremented, and a pixel of the pixel data is selected by using the x pixel number and the y pixel number as an index into the plurality of pixels. In an operation 616, whether or not the selected pixel is reflective is determined. If the selected pixel is reflective, processing continues at operation 614. If the selected pixel is not reflective, processing continues at an operation 618. In operation 618, a minimum x pixel number of the storm cell is initialized.

In an operation 620, the x pixel number is set to the x centroid pixel number. In an operation 622, the x pixel number is incremented, and a pixel of the pixel data is selected by using the x pixel number and the y pixel number as an index into the plurality of pixels. In an operation 624, whether or not the selected pixel is reflective is determined. If the selected pixel is reflective, processing continues at operation 622. If the selected pixel is not reflective, processing continues at an operation 626. In operation 626, a maximum x pixel number of the storm cell is initialized. Processing continues at A of FIG. 7.

With reference to FIG. 7, in an operation 700, the x pixel number is set to the x centroid pixel number. In an operation 702, the y pixel number is incremented, and a pixel of the pixel data is selected by using the x pixel number and the y pixel number as an index into the plurality of pixels. In an operation 706, whether or not the selected pixel is reflective is determined. If the selected pixel is reflective, processing continues at operation 708. If the selected pixel is not reflective, processing continues at an operation 710. In operation 708, the x pixel number is decremented, a pixel of the pixel data is selected by using the x pixel number and the y pixel number as an index into the plurality of pixels, and processing continues at operation 706. In operation 710, whether or not the x pixel number is less than the minimum x pixel number is determined. If the x pixel number is less than the minimum x pixel number, processing continues at operation 712. If the x pixel number is not less than the minimum x pixel number, processing continues at operation 714. In operation 712, the minimum x pixel number is set to the x pixel number.

In an operation 714, the x pixel number is set to the x centroid pixel number. In an operation 716, the x pixel number is incremented, and a pixel of the pixel data is selected by using the x pixel number and the y pixel number as an index into the plurality of pixels. In an operation 718, whether or not the selected pixel is reflective is determined. If the selected pixel is reflective, processing continues at operation 716. If the selected pixel is not reflective, processing continues at an operation 720. In operation 720, whether or not the x pixel number is greater than the maximum x pixel number is determined. If the x pixel number is greater than the maximum x pixel number, processing continues at operation 722. If the x pixel number is not greater than the maximum x pixel number, processing continues at operation 724.

In operation 722, the maximum x pixel number is set to the x pixel number. In operation 724, whether or not another row of pixels is included in the pixel data is determined. For example, an invalid y pixel number of a y pixel number greater than a maximum y pixel number may indicate that there is not another row of pixels to process. If there is not another row of pixels to process, processing may continue at B of FIG. 8. In an alternative embodiment, a height associated with the y pixel number is determined and the height is saved in a memory. Defining the height from the y pixel number after operation 724 does not include any additional storm height that may result from an overhang. If there is another row of pixels to process, processing continues at operation 700. The maximum x pixel number and the minimum x pixel number indicate the maximum extent of the storm cell in the dimension defined for the x direction. For example, the x direction may indicate a range from the radar antenna. The maximum range extent of the storm cell relative to the radar antenna can be calculated given a range resolution defined for the pixel data. In an exemplary embodiment, the range resolution can be multiplied by the difference between the maximum x pixel number and the minimum x pixel number to determine the maximum range extent of the storm cell.

To identify an overhang processing continues at operation 800. With reference to FIG. 8, in an operation 800, the x pixel number is initialized to the minimum x pixel number. In an operation 802, the y pixel number is initialized to a maximum y pixel number. In an operation 804, whether or not the selected pixel is reflective is determined. If the selected pixel is reflective, processing continues at an operation 814. If the selected pixel is not reflective, processing continues at an operation 806. In operation 806, whether or not the x pixel number is greater than or equal to the maximum x pixel number is determined. If the x pixel number is greater than or equal to the maximum x pixel number, processing continues at operation 810. If the x pixel number is not greater than or equal to the maximum x pixel number, processing continues at operation 808. In operation 808, the x pixel number is incremented and a pixel of the pixel data is selected by using the x pixel number and the y pixel number as an index into the plurality of pixels. In operation 810, the x pixel number is initialized to the minimum x pixel number. In operation 812, the y pixel number is decremented, a pixel of the pixel data is selected by using the x pixel number and the y pixel number as an index into the plurality of pixels, and processing continues at operation 804.

In operation 814, a height associated with the y pixel number is determined. In an operation 816, the height is saved in a memory. In an operation 818, whether or not another storm cell is within the pixel data is determined. If another storm cell is within the pixel data, processing continues at C of FIG. 6. If another storm cell is not within the pixel data, processing of the received pixel data ends. As known to those skilled in the art, modifications of the operations just described can be performed without changing the overall methodology. For example, the maximum x pixel number can be traversed before the minimum x pixel number.

Figure 9:
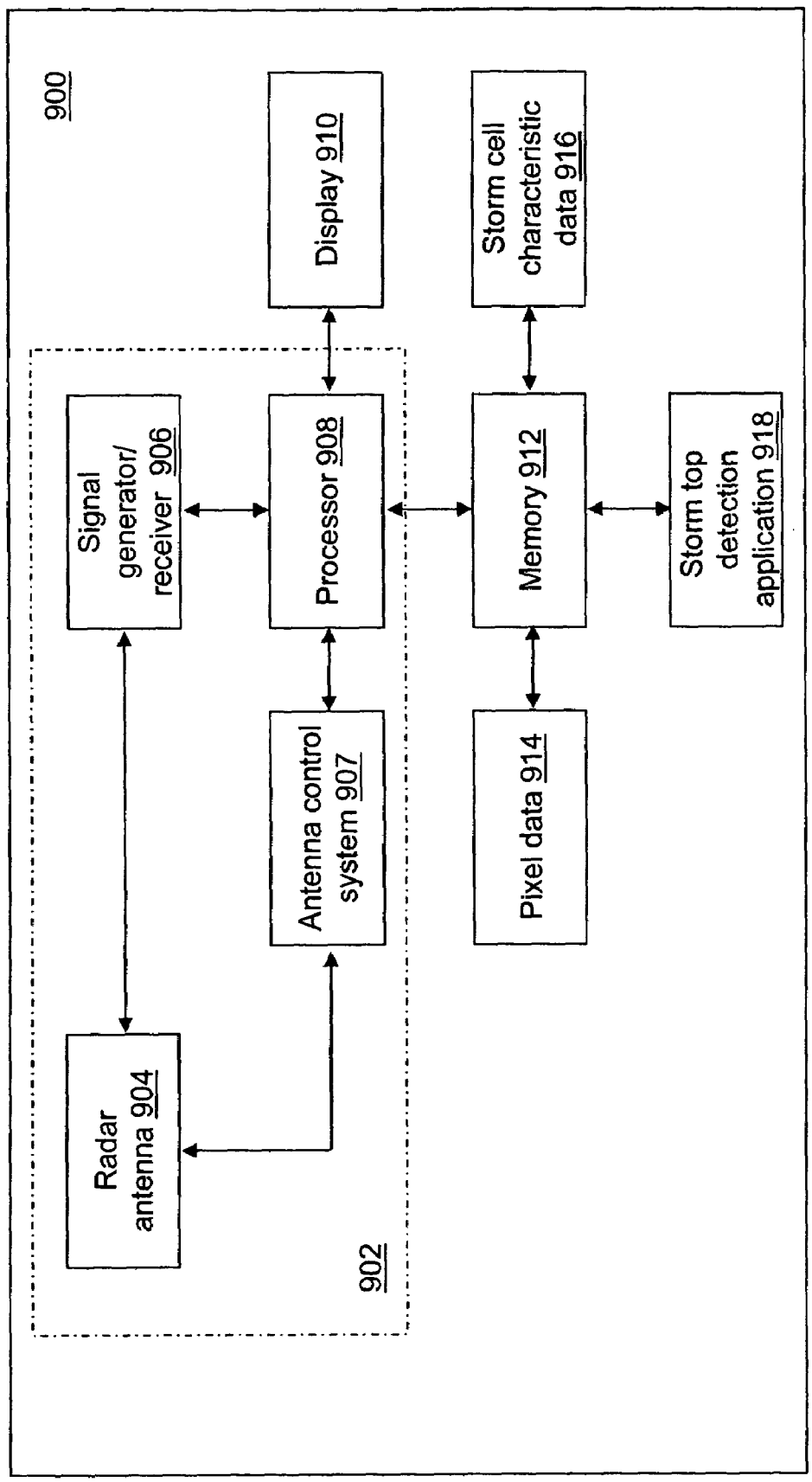
FIG. 9 is a block diagram of a storm top detection and prediction system in accordance with an exemplary embodiment.

With reference to FIG. 9, a weather radar system 900 is shown in an exemplary embodiment. Weather radar system 900 includes a radar system 902. Radar system 902 may include a radar antenna 904, a signal generator/receiver 906, a processor 908, and an antenna control system 907. Radar antenna 904 may include one or more antenna element. In an exemplary embodiment, an antenna element is a transducer that converts electromagnetic fields into alternating electric currents and vice-versa. For example, radar antenna 904 may be a single antenna element, separate transmit and receive antenna elements, a phased array antenna, a linear array of antenna elements, dual band antenna, etc. A variety of antenna designs may be utilized depending on the application for the radar system. For example, the antenna design may be selected based on the types of objects to be detected, the distance at which detection of the object is desired, the speed, if any, of the object, whether or not an image is formed of the object and/or tracking of the object is performed, etc. as known to those skilled in the art both now and in the future. With reference to the exemplary embodiment of FIG. 9, radar system 902 detects information associated with weather.

Signal generator/receiver 906 generates signals that may be appropriately timed and shaped output pulses, discrete frequencies, chirp pulses, etc., as required for the type of radar application. The output signal of signal generator/receiver 906 may be provided through a power amplifier to radar antenna 904 that converts the generated signal to electromagnetic fields. Radar antenna 904 radiates the electromagnetic fields in a direction defined relative to an antenna boresight. An antenna boresight refers to the physical broadside axis of a directional antenna. The radiated energy may be centered about the antenna boresight or may be directed relative to the antenna boresight as in electronic steering of a phased array antenna relative to the antenna boresight. An antenna coordinate reference system is typically defined such that the antenna boresight corresponds to the positive z axis. The antenna coordinate reference system may be defined with respect to a coordinate reference system of the aircraft to which radar system 902 is mounted.

Additionally, a directional coupler may be used depending on the type of antenna system used. In an exemplary embodiment, signal generator/receiver 906 provides detection of a signal and conversion of the detected signal to digitized data, for example by sampling of the received signal. The digitized data may be provided to a digital signal processor within the signal generator/receiver 906 or to processor 908 appropriately programmed to process the digital signal.

Processor 908 executes instructions. The instructions may be carried out by a special purpose computer, logic circuits, or hardware circuits. Thus, processor 908 may be implemented in hardware, firmware, software, or any combination of these methods. The term "execution" is the process of running an application or the carrying out of the operation called for by an instruction. The instructions may be written using one or more programming language, scripting language, assembly language, etc. It is understood that any type of processor that can be programmed to carry out the signal/data processing set forth herein may be utilized. The digital signal may be saved in a memory 912 coupled to the processor as known to those skilled in the art. Processor 908 can receive the digital signal representing the radar return directly or through memory 912. Weather radar system 900 may include a plurality of processors that use the same or a different processing technology.

Antenna control system 907 controls the positioning of radar antenna 904. Antenna control system 907 may be an electronic system or an electro-mechanical system that physically moves radar antenna 907 without limitation. Antenna control system 907 couples to processor 908. Processor 908 provides signals to antenna control system 907 to control the position of radar antenna 904. The position or orientation of radar antenna 904 can be adjusted, for example, with respect to elevation, azimuth, and roll angles that define the location of the antenna boresight. If radar antenna 904 includes a plurality of antenna elements, antenna control system 907 may control the position or orientation of each antenna element individually or as an ensemble.

Weather radar system 900 may further include a display 910. Display 910 presents information to the user of radar system 902 including, but not limited to, information related to radar system 902 such as images of the weather detected. Display 910 may be a thin film transistor (TFT) display, a light emitting diode (LED) display, a Liquid Crystal Display (LCD), a Cathode Ray Tube (CRT) display, etc. as known to those skilled in the art both now and in the future. Exemplary images displayed with display 910 include representations of weather regions, rainfall densities, turbulence regions, etc. Weather radar system 900 may include a plurality of displays that use the same or a different display technology. Display 910 can be a multifunction flight display (MFD).

Weather radar system 900 may further include memory 912. Weather radar system 900 may have one or more memories 912 that use the same or a different type of memory technology. Memory 912 stores information for access by other elements of weather radar system 900. For example, memory 912 may store pixel data 914, storm cell characteristic data 916, in addition to other information associated with weather radar system 900. Exemplary weather characteristic data includes storm cell height data, storm cell maturity data, storm cell hazard data, atmospheric instability information, etc. Memory technologies include, but are not limited to, random access memory, read only memory, flash memory, etc. and include both volatile and non-volatile storage.

Weather radar system 900 further includes storm top detection application 918. Storm top detection application 918 performs operations associated with determining a height of a storm cell. Some or all of the operations described with reference to FIGS. 2 and 5-8 may be embodied in storm top detection application 918. The operations may be implemented using hardware, firmware, software, or any combination of these methods.

With reference to the exemplary embodiment of FIG. 9, storm top detection application 918 is implemented in software stored in memory 912 and accessible by processor 908 for execution of the instructions that embody the operations of storm top detection application 918. Storm top detection application 918 may be written using one or more programming languages, assembly languages, scripting languages, etc. A storm cell height is determined by execution of the instructions of storm top detection application 918. The operations of storm top detection application 918 may be performed periodically, in pseudo real-time, and/or in real-time. For example, a storm cell height may be determined at the end of a vertical scan sequence, every two seconds, etc.

The elements of weather radar system 900 may be integrated or separated according to particular needs. For example, the functions of processor 908 and memory 912 may be provided using a single component. If processor 908 and memory 912 are separated, processor 908 may be coupled to memory 912 using a bus or other suitable link. Memory 912 may be local to or remote from radar system 902. In one preferred embodiment, the platform and software of a WXR-2100 weather radar system manufactured by Rockwell Collins, Inc. or an RDR 4000 weather radar system manufactured by Honeywell International can be configured to include the above-listed components of weather radar system 900.

Figure 10:
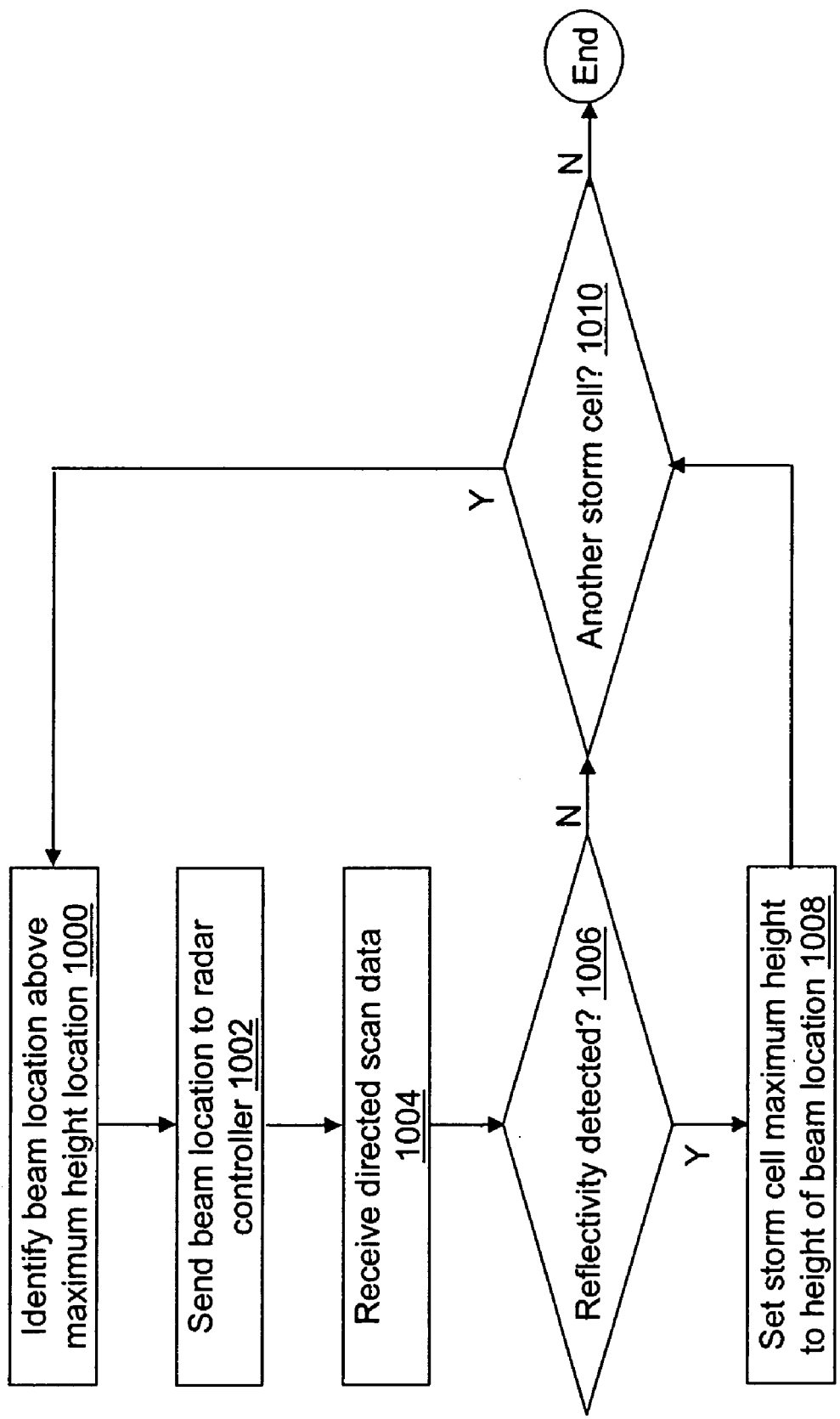
FIG. 10 is a flow diagram illustrating exemplary operations performed by a storm top detection application to improve the maximum height determined for the storm cell in accordance with a first exemplary embodiment.

With reference to FIG. 10, exemplary operations in improving a storm top height determination are described. Additional, fewer, or different operations may be performed, depending on the embodiment without deviating from the spirit of the invention. In an operation 1000, a beam location for a directed scan of the storm cell is determined based on the maximum height determined in operation 238. The beam location is positioned above the location of the determined maximum height of the storm cell. In an operation 1002, the determined beam location is sent to the radar controller. The directed scan of the storm cell is conducted by transmitting a signal centered at the beam location and receiving returns from the beam location. The directed scan increases the resolution and/or the sensitivity of the scan data and a sensitivity may be adjusted based on the geographic region. For example, the resolution and/or the sensitivity is increased by increasing the dwell time, increasing the gain, etc. as known to those skilled in the art both now and in the future.

In an operation 1004, the directed scan data is received from the radar receiver. In an operation 1006, a determination of whether or not the directed scan data indicates reflectivity is performed. If the directed scan data indicates reflectivity, processing continues at an operation 1008. In an operation 1008, the maximum height (storm top) of the storm cell is set to the height of the beam location of the directed scan. If the directed scan data does not indicate reflectivity, processing continues at an operation 1010, and the previously determined maximum height is not changed. In operation 1010, whether or not another storm cell is within the pixel data is determined. If another storm cell is within the pixel data, processing continues at operation 1000. If another storm cell is not within the pixel data, processing of the received pixel data ends.

Figure 11:
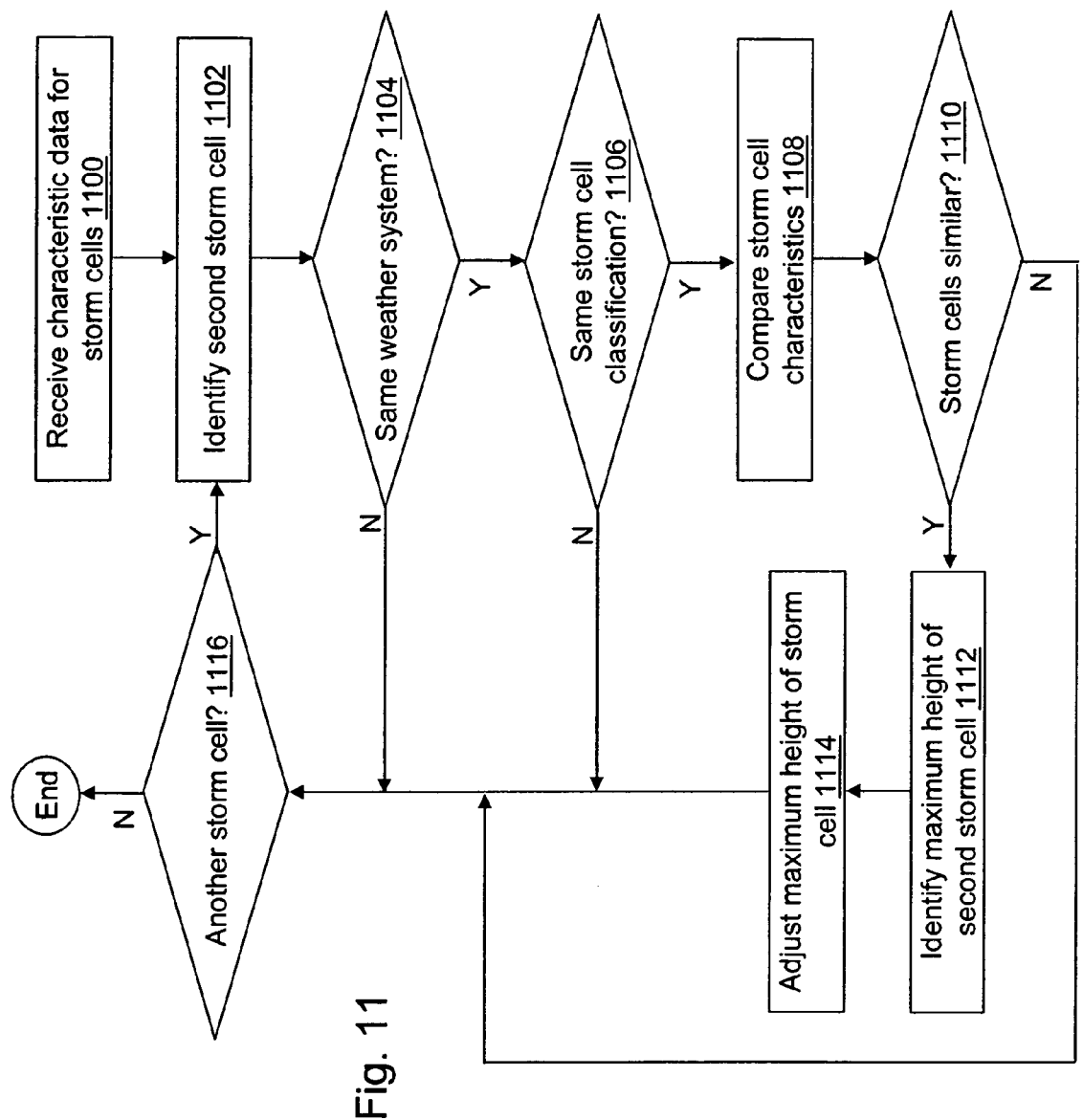
FIG. 11 is a flow diagram illustrating exemplary operations performed by a storm top detection application to improve the maximum height determined for the storm cell in accordance with a second exemplary embodiment.

With reference to FIG. 11, exemplary operations in improving a storm top height determination are described. Additional, fewer, or different operations may be performed, depending on the embodiment without deviating from the spirit of the invention. In an operation 1100, characteristic data for storm cells is received. In an operation 1102, a second storm cell different from the current storm cell is identified from the received characteristic data. In an operation 1104, whether or not the current storm cell and the second storm cell are part of the same weather system is determined. For example, a determination may be made based on a comparison of the distance between the current storm cell and the second storm cell with a threshold distance. As another example, a determination may be made to identify if the current storm cell and the second storm cell are contiguous with each other based on a reflectivity threshold and an isotherm atmospheric layer. For example, if a reflectivity level is contiguous at or below a 0° Celsius isotherm atmospheric layer, the storm cells may be determined to be part of the same weather system. If the current storm cell and the second storm cell are part of the same weather system, processing continues at operation 1106. If the current storm cell and the second storm cell are not part of the same weather system, processing continues at an operation 1116.

In operation 1106, whether or not the current storm cell and the second storm cell are classified as the same type of storm cell is determined. Exemplary storm cell type classifications include air mass, Orographic, Mesoscale system, squall line, etc. If the current storm cell and the second storm cell are the same type, processing continues at operation 1108. If the current storm cell and the second storm cell are not the same type, processing continues at operation 1116. In operation 1108, one or more storm cell characteristics are compared to determine the similarity of the current storm cell and the second storm cell. Exemplary storm cell characteristics include area, vertical reflectivity profile, lightning flash rate, etc. In operation 1110, whether or not the current storm cell and the second storm cell are similar is determined. For example, two storm cell may be determined to be similar by evaluating the trending characteristics of each storm cell as a function of time. If the current storm cell and the second storm cell are similar, processing continues at an operation 1112. If the current storm cell and the second storm cell are not similar, processing continues at operation 1116. In operation 1112, the maximum height of the second storm cell is identified from the received characteristic data. In operation 1114, the maximum height of the current storm cell is adjusted based on the identified maximum height of the second storm cell. In operation 1116, whether or not another storm cell is within the pixel data is determined. If another storm cell is within the pixel data, processing continues at operation 1102. If another storm cell is not within the pixel data, processing of the received pixel data ends.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A radar system for an aircraft, the radar system characterizing a storm cell maximum height, the radar system comprising:
    an antenna adapted to receive signals reflected from a storm cell;
    a receiver coupled to the antenna, the receiver adapted to process the received signals thereby forming reflectivity data associated with a scan of the storm cell;
    a processor coupled to the receiver, the processor configured to
    (a) receive first reflectivity data from the receiver formed from a first scan of the storm cell;
    (b) identify a first centroid of the storm cell based on the received first reflectivity data;
    (c) receive second reflectivity data from the receiver formed from a second scan of the storm cell;
    (d) identify a second centroid of the storm cell based on the received second reflectivity data;
    (e) determine a scan axis for a third scan of the storm cell based on the first centroid and the second centroid;
    (f) send the identified scan axis to a radar controller adapted to control execution of the third scan;
    (g) receive third reflectivity data from the receiver formed from the third scan of the storm cell at a first time;
    (h) sample the received third reflectivity data to form pixel data, wherein the pixel data comprises a plurality of pixels, wherein each pixel of the plurality of pixels identifies a segment of the third reflectivity data, and further wherein a reflectivity indicator is determined for each pixel; and
    (i) process the formed pixel data to determine a first maximum height of the storm cell; and
    a memory operably coupled to the processor to receive and to store the pixel data.

2. A computer program product comprising a computer-readable medium having computer-readable instructions stored thereon that, upon execution by a processor, cause the processor to characterize a storm cell maximum height for an aircraft, the instructions comprising:
    (a) receiving first reflectivity data formed from a first scan of a storm cell by a radar;
    (b) identifying a first centroid of the storm cell based on the received first reflectivity data;
    (c) receiving second reflectivity data formed from a second scan of the storm cell by the radar;
    (d) identifying a second centroid of the storm cell based on the received second reflectivity data;
    (e) determining a scan axis for a third scan of the storm cell based on the first centroid and the second centroid;
    (f) receiving third reflectivity data formed from the third scan of the storm cell by the radar at a first time;
    (g) sampling the received third reflectivity data to form pixel data, wherein the pixel data comprises a plurality of pixels, wherein each pixel of the plurality of pixels identifies a segment of the third reflectivity data, and further wherein a reflectivity indicator is determined for each pixel; and
    (h) processing the formed pixel data to determine a first maximum height of the storm cell.

3. A method of characterizing a storm cell maximum height for an aircraft, the method comprising:
    (a) receiving first reflectivity data formed from a first scan of a storm cell by a radar;
    (b) identifying a first centroid of the storm cell based on the received first reflectivity data;
    (c) receiving second reflectivity data formed from a second scan of the storm cell by the radar;
    (d) identifying a second centroid of the storm cell based on the received second reflectivity data;
    (e) determining a scan axis for a third scan of the storm cell based on the first centroid and the second centroid;
    (f) receiving third reflectivity data formed from the third scan of the storm cell by the radar at a first time;
    (g) sampling the received third reflectivity data to form pixel data, wherein the pixel data comprises a plurality of pixels, wherein each pixel of the plurality of pixels identifies a segment of the third reflectivity data, and further wherein a reflectivity indicator is determined for each pixel; and
    (h) processing the formed pixel data to determine a first maximum height of the storm cell.

4. The method of claim 3, wherein processing the formed pixel data comprises traversing the plurality of pixels to identify a pixel associated with the first maximum height, wherein the reflectivity indicator of the pixel indicates a reflectivity value that exceeds a threshold.

5. The method of claim 4, wherein the reflectivity indicator is the reflectivity value.

6. The method of claim 4, wherein the reflectivity indicator is a flag that indicates whether or not the reflectivity value exceeds the threshold.

7. The method of claim 4, wherein the plurality of pixels are indexed using an x pixel number and a y pixel number, the height of the segment of the storm cell calculable using the y pixel number.

8. The method of claim 7, wherein traversing the plurality of pixels comprises identifying a third centroid of the received third reflectivity data, the third centroid identified by an x centroid pixel number.

9. The method of claim 8, wherein traversing the plurality of pixels further comprises:
   (i) initializing the x pixel number to the x centroid pixel number and the y pixel number to a first y pixel number;
   (j) determining if the reflectivity indicator of a pixel indexed with the x pixel number and the y pixel number indicates a reflectivity value that exceeds the threshold;
   (k) if the reflectivity indicator of the pixel indicates a reflectivity value that exceeds the threshold, setting a flag to indicate a reflective pixel is found and incrementing the y pixel number;
   (l) if the reflectivity indicator of the pixel does not indicate a reflectivity value that exceeds the threshold and the flag is not set, incrementing the y pixel number;
   (m) if the reflectivity indicator of the pixel does not indicate a reflectivity value that exceeds the threshold and the flag is set, identifying a height associated with the y pixel number of the pixel; and
   (n) repeating (j)-(m) until the height is identified;
   wherein the determined first maximum height is the identified height.

10. The method of claim 8, wherein traversing the plurality of pixels further comprises:
    (i) initializing the x pixel number to the x centroid pixel number and the y pixel number to a first y pixel number;
    (j) determining if the reflectivity indicator of a pixel indexed with the x pixel number and the y pixel number indicates a reflectivity value that exceeds the threshold;
    (k) if the reflectivity indicator of the pixel does not indicate a reflectivity value that exceeds the threshold, incrementing the y pixel number and repeating (j) until the reflectivity indicator of the pixel indicates a reflectivity value that exceeds the threshold;
    (l) if the reflectivity indicator of the pixel indicates a reflectivity value that exceeds the threshold, identifying a minimum x-pixel number and a maximum x-pixel number for the y pixel number, and incrementing the y pixel number;
    (m) repeating (l) for the incremented y pixel number as the y pixel number to update the minimum x-pixel number and the maximum x-pixel number, and incrementing the y pixel number until the reflectivity indicator of the pixel indexed with the x centroid pixel number and the incremented y pixel number indicates a reflectivity value that does not exceed the threshold; and
    (n) initializing the x pixel number to the minimum x-pixel number and the y pixel number to a second y pixel number;
    (o) after (n), determining if the reflectivity indicator of the pixel indexed with the x pixel number and the y pixel number indicates a reflectivity value that exceeds the threshold;
    (p) after (o), if the reflectivity indicator of the pixel indexed with the x pixel number and the y pixel number does not indicate a reflectivity value that exceeds the threshold, incrementing the x pixel number;
    (q) after (p), if the reflectivity indicator of the pixel indexed with the x pixel number and the y pixel number does not indicate a reflectivity value that exceeds the threshold, repeating (o)-(p) until the incremented x pixel number exceeds the maximum x-pixel number;
    (r) after (o), if the reflectivity indicator of the pixel indexed with the x pixel number and the y pixel number indicates a reflectivity value that exceeds the threshold, identifying a height associated with the y pixel number of the pixel; and
    (s) if the height is not identified, decrementing the y pixel number and repeating (o)-(r);
    wherein the determined first maximum height is the identified height.

11. The method of claim 8, wherein traversing the plurality of pixels further comprises:
    (i) initializing the x pixel number to the x centroid pixel number and the y pixel number to a first y pixel number;
    (j) determining if the reflectivity indicator of a pixel indexed with the x pixel number and the y pixel number indicates a reflectivity value that exceeds the threshold;
    (k) if the reflectivity indicator of the pixel indicates a reflectivity value that exceeds the threshold, setting a flag to indicate a reflective pixel is found and incrementing the y pixel number;
    (l) if the reflectivity indicator of the pixel does not indicate a reflectivity value that exceeds the threshold and the flag is not set, incrementing the y pixel number;
    (m) if the reflectivity indicator of the pixel does not indicate a reflectivity value that exceeds the threshold and the flag is set, identifying a height associated with the y pixel number of the pixel and determining a storm top height using the identified height and a reflectivity model, wherein the reflectivity model describes a variation in reflectivity as a function of altitude; and
    (n) repeating (j)-(m) until the storm top height is determined;
    wherein the determined first maximum height is the determined storm top height.

12. The method of claim 4, wherein the plurality of pixels are indexed using an x pixel number and a y pixel number, the height of the segment of the storm cell calculable using the y pixel number and the x pixel number.

13. The method of claim 3, further comprising repeating (a)-(d) for a plurality of storm cells, determining an order for executing the third scan for the plurality of storm cells, and repeating (e)-(h) for the plurality of storm cells in the determined order.

14. The method of claim 13, wherein determining the order is based on a parameter selected from the group consisting of a distance from the radar to the storm cell, a last scan time of the storm cell, and a maturity of the storm cell.

15. The method of claim 3, wherein the first scan and the second scan comprise horizontal scans of the isotherm atmospheric layer.

16. The method of claim 15, wherein the isotherm atmospheric layer of the first scan comprises an approximately zero to negative ten degree Celsius layer.

17. The method of claim 15, wherein the isotherm atmospheric layer of the first scan comprises an approximately negative twenty to negative forty degree Celsius layer.

18. The method of claim 3, further comprising determining a plurality of beam locations based on the determined scan axis.

19. The method of claim 3, further comprising:
identifying a beam location above the determined first maximum height of the storm cell;
receiving fourth reflectivity data formed from a directed scan of the identified beam location performed by the radar;
determining if the received fourth reflectivity data indicates a reflectivity value that exceeds the threshold;
identifying a beam height with the identified beam location; and
if the received fourth reflectivity data indicates a reflectivity value that exceeds the threshold, setting the first maximum height of the storm cell to the identified beam height.

20. The method of claim 19, wherein the directed scan increases at least one of the resolution and the sensitivity of the fourth reflectivity data.

21. The method of claim 3, further comprising:
identifying a second storm cell, wherein the second storm cell is part of the same weather system as the storm cell;
comparing a characteristic of the storm cell with a second characteristic of the second storm cell;
determining if the storm cell is similar to the second storm cell based on the compared characteristic and second characteristic; and
if the storm cell is similar to the second storm cell, identifying a maximum height of the second storm cell and adjusting the determined first maximum height of the storm cell based on the identified maximum height of the second storm cell.

22. The method of claim 21, further comprising identifying the maximum height of the second storm cell and adjusting the determined first maximum height of the storm cell only if a classification of the storm cell and a second classification of the second storm cell are the same.

23. The method of claim 21, wherein the characteristic of the storm cell is selected from the groups consisting of an area of the storm cell, a vertical reflectivity profile of the storm cell, a variation of the storm cell as a function of time, and a lightning flash rate.

24. The method of claim 21, further comprising determining if the second storm cell is part of the same weather system as the storm cell by comparing a distance between the storm cell and the second storm cell.

25. The method of claim 21, further comprising determining if the second storm cell is part of the same weather system as the storm cell by determining if the storm cell and the second storm cell are contiguous at or below a 0° Celsius isotherm atmospheric layer.

26. The method of claim 25, wherein the second range is less than half of the first range.

27. The method of claim 26, further comprising:
identifying a second scan region defined by a second minimum azimuth angle and a second maximum azimuth angle,
wherein the second minimum azimuth angle identifies the minimum azimuth angle relative to the second centroid of reflectivity data that exceeds a reflectivity threshold in a decreasing azimuth direction of the received second reflectivity data, and
further wherein the second maximum azimuth angle identifies the maximum azimuth angle relative to the second centroid of reflectivity data that exceeds a reflectivity threshold in an increasing azimuth direction of the received second reflectivity data;
wherein the third scan further includes the second scan region.

28. The method of claim 3, wherein the first scan extends to a first range, the third scan extends to a second range, and the second range is less than the first range.

29. The method of claim 3, further comprising:
identifying a first scan region defined by a first minimum azimuth angle and a first maximum azimuth angle,
wherein the first minimum azimuth angle identifies the minimum azimuth angle relative to the first centroid of reflectivity data that exceeds a reflectivity threshold in a decreasing azimuth direction of the received first reflectivity data, and
further wherein the first maximum azimuth angle identifies the maximum azimuth angle relative to the first centroid of reflectivity data that exceeds a reflectivity threshold in an increasing azimuth direction of the received first reflectivity data;
wherein the third scan further includes the first scan region.

30. The method of claim 29, wherein the third scan further includes a region connecting the first scan region and the second scan region.

31. The method of claim 3, further comprising:
identifying a first scan region defined by a first minimum azimuth angle and a first maximum azimuth angle,
wherein the first minimum azimuth angle identifies the minimum azimuth angle of lightning data associated with the storm cell, and
further wherein the first maximum azimuth angle identifies the maximum azimuth angle of lightning data associated with the storm cell;
wherein the third scan further includes the first scan region.

32. A radar system for an aircraft, the radar system characterizing a storm cell maximum height, the radar system comprising:
an antenna means adapted to receive signals reflected from a storm cell;
a receiver means coupled to the antenna, the receiver means adapted to process the received signals thereby forming reflectivity data associated with a scan of the storm cell;
a processor means coupled to the receiver means, the processor means configured to
(a) receive first reflectivity data from the receiver formed from a first scan of the storm cell;
(b) identify a first centroid of the storm cell based on the received first reflectivity data;
(c) receive second reflectivity data from the receiver formed from a second scan of the storm cell;
(d) identify a second centroid of the storm cell based on the received second reflectivity data;
(e) determine a scan axis for a third scan of the storm cell based on the first centroid and the second centroid;
(f) send the identified scan axis to a radar controller adapted to control execution of the third scan;
(g) receive third reflectivity data from the receiver formed from the third scan of the storm cell at a first time;
(h) sample the received third reflectivity data to form pixel data, wherein the pixel data comprises a plurality of pixels, wherein each pixel of the plurality of pixels identifies a segment of the third reflectivity data, and further wherein a reflectivity indicator is determined for each pixel; and
(i) process the formed pixel data to determine a first maximum height of the storm cell; and
a memory means operably coupled to the processor means to receive and to store the pixel data.

* * * * *